United States Patent [19]
Sokolski

[11] 3,943,642
[45] Mar. 16, 1976

[54] TRIM MARKS OF EQUILATERAL TRIANGULAR SHAPE

[75] Inventor: Michael Sokolski, Newport Beach, Calif.

[73] Assignee: Scan-Tron Corporation, Los Angeles, Calif.

[22] Filed: Oct. 9, 1974

[21] Appl. No.: 513,286

[52] U.S. Cl.............. 35/48 R; 235/61.12 N; 33/12
[51] Int. Cl.² ....................................... G06K 19/04
[58] Field of Search ............... 35/48 R, 48 A, 48 B; 101/227, 247, 248; 235/61.12 N; 33/12; 2/243 B; 11/1 R; 83/522

[56] References Cited
UNITED STATES PATENTS

| | | | |
|---|---|---|---|
| 1,982,005 | 11/1934 | Hutter | 33/12 |
| 2,892,196 | 6/1959 | Pundyk et al. | 33/12 X |
| 3,808,406 | 4/1974 | Oberg et al. | 235/61.12 N |

Primary Examiner—John H. Wolff
Attorney, Agent, or Firm—Howard A. Silber

[57] ABSTRACT

Trim marks of equilateral triangular shape are used to define a trim line for sheets containing machine-readable indicia. Each trim mark consists of an equilateral triangle with one corner situated along the trim line, an adjacent side extending perpendicular to that trim line, and an opposite side parallel to but spaced from the trim line. The length of the adjacent side corresponds to the acceptable severance tolerance for the trim line, so that if the sheet is cut away from the desired trim line, the visable width of the truncated triangular trim mark will equal the amount of offset. Advantageously, differently spaced pairs of such trim marks are employed on opposite sides of the desired trim line so that the separation distance between the truncated triangles provides a visual indication of the direction and possible skew of severance offset.

6 Claims, 8 Drawing Figures

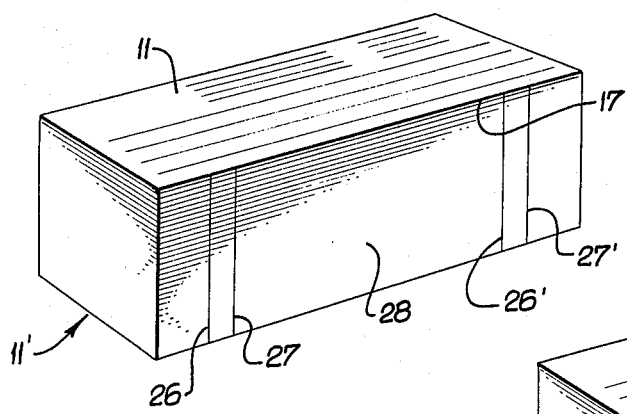
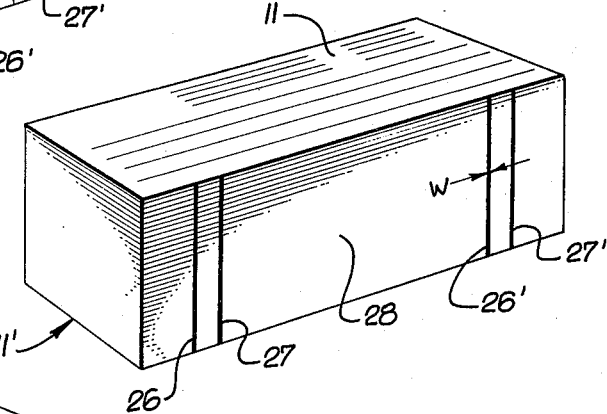
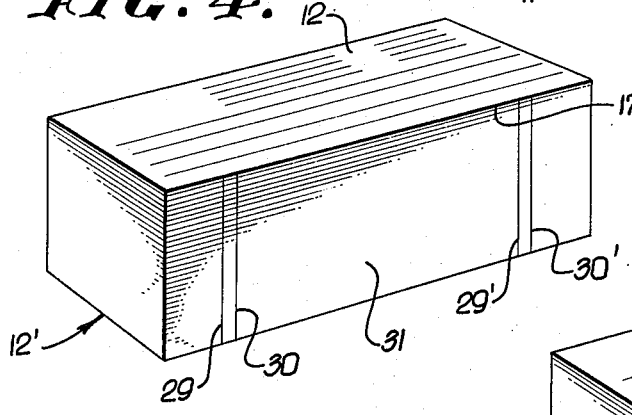
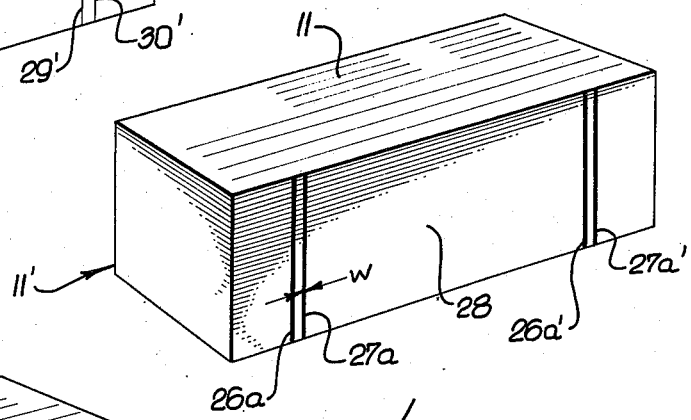
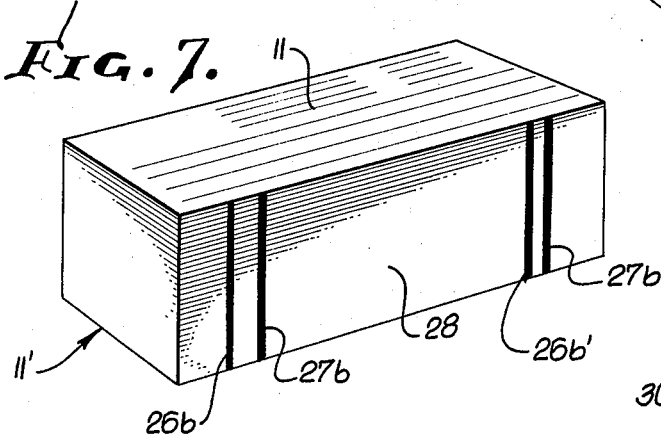
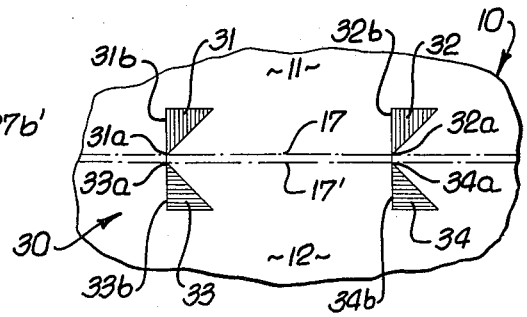

TRIM MARKS OF EQUILATERAL TRIANGULAR SHAPE

BACKGROUND OF THE INVENTION

1. Field of the Invention

The present invention relates to tolerance indicating trim marks for printed sheets containing machine readable indicia.

2. Description of the Prior Art

Automatic test scoring devices are widely used to score test sheets on which answers have been marked in designated true/false or multiple choice answer spaces. An example of such device and of the test sheets used thereby is disclosed in the inventor's U.S. Pat. No. 3,800,439 entitled TEST SCORING APPARATUS. In such devices, answer marks are detected electro-optically as each test sheet is transported past a photo-electric reading head.

For error-free operation, the answer spaces on each test sheet must be spaced certain distances from a reference edge of the sheet. These distances correspond to the positions of photosensors in the reading head with respect to a guide for the test sheet reference edge. Typically the answer spaces are arranged in columns parallel to the reference edge, with the answer blocks in each column being a fixed distance from the reference edge.

If the reference edge is skewed with respect to the columns of answer spaces, not all of the spaces will be aligned with the corresponding sensors as the sheet is transported past the read head. Incorrect scoring will result.

To avoid this problem, the answer spaces are printed on a page together with a trim line defining the reference edge. The page subsequently is severed along the trim line, so that in the resultant answer sheet the answer spaces are exactly spaced the desired distance from the reference edge. Two answer sheets may be printed simultaneously on the same page, so that the single trim line defines the reference edges for both test sheets.

Some tolerance is permitted in the position of the reference edge with respect to the answer spaces. To inform the printer that the pages have been severed within this acceptable range, tolerance indicating trim marks advantageously are printed on the page along the trim line.

An example of such trim marks is disclosed in the U.S. Pat. No. 3,808,406. There each mark consists of a generally rectangular tolerance indicating portion and a coaxial line portion extending from the ends thereof. The line portion designates the exact trim line, and the transverse dimension of the tolerance indicating portion corresponds to the allowable trim tolerance. If the page is severed within acceptable limits, a solid band of ink is visible down the edge of a stack of sheets. Absence of this band indicates that the sheets have been cut improperly and must be discarded.

It is an object of the present invention to provide improved trim marks for a test sheet. These trim marks not only indicate whether the pages have been severed within acceptable tolerance, but also tell exactly how far from the trim line the actual cut has been made. Moreover, the inventive trim marks also indicate at a glance whether and in which direction the cut edge is skewed.

Although intended primarily for test answer sheets, the trim marks disclosed herein have other applications. For example, in the printing of bank checks which contain machine readable bank transit and account numbers along one edge, that edge must be exactly spaced from the bottom of the numbers. The inventive trim marks may be used to define the trim line and acceptable tolerance for trimming such bank checks.

SUMMARY OF THE INVENTION

These and other objectives are achieved by printing on the answer sheet or other document trim marks comprising sets of equilateral triangles arranged so that one corner of each triangle lies along the trim line. Since the loci of these corner points define the trim line, there is no need to print a separate line defining the trim line itself.

The side of each triangle adjacent the one corner is perpendicular to the trim line, and the side opposite this corner is parallel to the trim line. Since the triangle is equilateral, if the page is severed away from the trim line, the width of the truncated portion of the triangle will be equal to the amount of offset error in the cut.

Preferably the triangles are arranged in widely spaced sets along the trim line. Each such set includes a first pair of triangles on one side of the trim line and a second pair on the opposite side, with the trim line defining corners of the second pair between the like corners of the first pair.

In this way, if a stack of the cut sheets are viewed edge on, the spacing between the marks will indicate whether the cut is perfect, is displaced in one or the opposite direction from the train line, or is skewed.

BRIEF DESCRIPTION OF THE DRAWINGS

A detailed description of the invention will be made with reference to the accompanying drawings wherein like numerals designate corresponding elements in the several figures.

FIGS. 3 and 4 are perspective views of stacks of test sheets prepared from pages like that of FIG. 1, which have been severed exactly along the trim line defined by the inventive trim marks.

FIGS. 5 and 6 are perspective views like FIG. 3 in which the pages have been severed parallel to, but offset from the exact trim line, but within acceptable tolerances.

FIG. 7 is a perspective view like FIG. 3, but wherein the pages have been severed along a line skewed with respect to the exact trim line.

FIG. 8 is an enlarged fragmentary view like FIG. 2 showing an alternative arrangement of the equilateral triangular trim marks.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
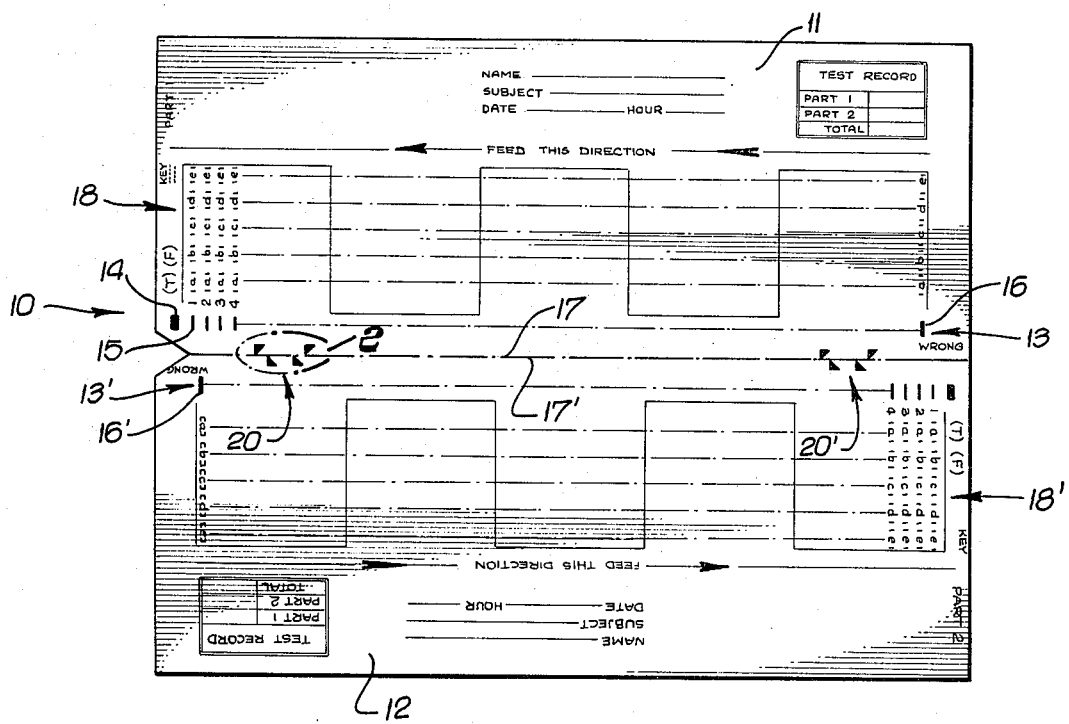
FIG. 1 is a plan view of a page containing the inventive trim marks; two test sheets are printed on the page.

Referring to FIG. 1, there is shown a page 10 of paper or like material on which has been printed two test sheets 11, 12. The illustrative test sheet 11 contains a column 13 of control marks 14, 15, 16 all of which are uniformly spaced from a trim line 17 which defines a reference edge for the test sheet 11. Also printed on the sheet 11 are a plurality of answer spaces 18, sets of which are row-aligned with the corresponding control marks 15. These answer spaces 18 are positioned at certain distances with respect to the reference edge 17 so as to be aligned with corresponding electro-optical sensors of the test scoring apparatus used to score the test sheet 11. Similarly, the test sheet 12 contains a row 13' of control marks, and sets of answer spaces 18' all spaced certain distances from a reference edge 17'.

After printing, the page 10 is severed along the trim line to produce the separate test sheets 11 and 12. As discussed previously, the page 10 must be severed within an acceptable tolerance range so that the control marks 13' and the answer spaces 18, 18' will be correctly spaced from the resultant reference edges of the severed test sheets 11, 12. To insure such correct severance, sets 20, 20' of trim marks in accordance with the present invention are printed on each page 10 simultaneously with printing of the control marks in the columns 13, 13' and the answer spaces 18, 18'.

Figure 2:
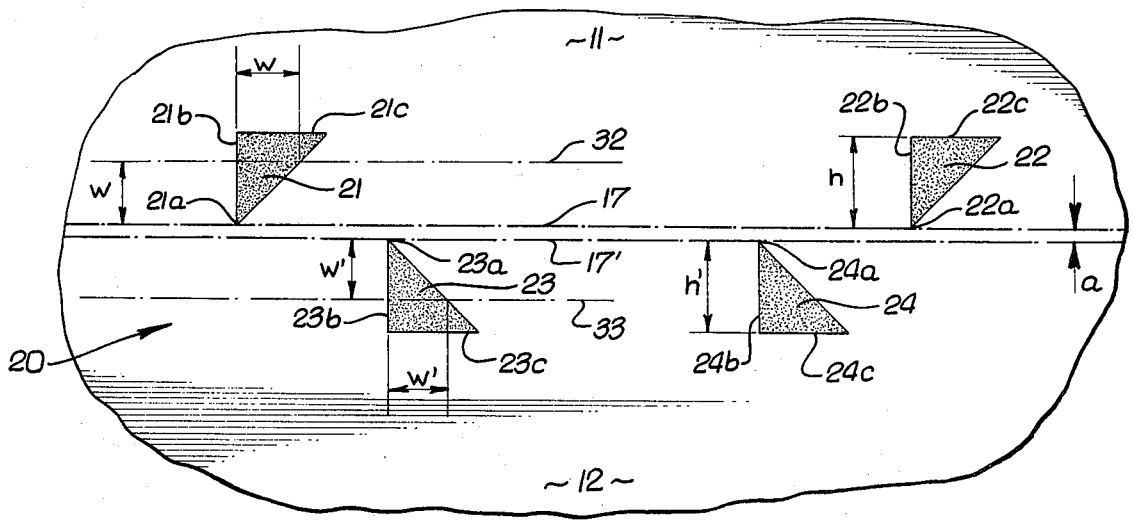
FIG. 2 is an enlarged, fragmentary view of one set of trim marks printed on the page of FIG. 1.

As best shown in FIG. 2, each set 20, 20' advantageously contains four individual trim marks 21 – 24 each in the shape of an equilateral triangle. The triangles 21, 22 are printed on the test sheet 11 and have their respective corners 21a, 22a situated exactly along the desired reference edge 17. The triangles 23, 24 are printed on the test sheet 12 and have their respective corners 23a, 24a situated exactly along the reference edge 17' for the test sheet 12. The reference edges 17, 17' together define the trim line along which the page 10 is to be severed. Advantageously, but not necessarily, this trim line is not actually printed on the page 10. The thickness of the trim line, i.e., the distance between the reference edges 17 and 17', may correspond to the width of the blade edge used to sever the page 10. Alternatively, the reference edges 17 and 17' may be the same, so that the distance a is zero.

Each triangle 21 – 24 is equilateral. The respective side 21b – 24b adjacent to the respective one corner 21a – 24a is perpendicular to the respective reference edge 17, 17'. The other side 21c – 24c opposite the respective one corner 21a – 24a is parallel to the trim line defined by the reference edges 17, 17' but spaced therefrom. In accordance with the present invention, the length of each side 21b – 24b is equal to the acceptable trim tolerance. That is, the page 10 can be cut along a line offset from the reference edges 17, 17' so long as the actual distance of this cut away from the trim line defined by the edges 17, 17' is less than the height $h$ of the tolerance-defining triangle sides 21b – 24b. The tolerance $h$ for the sheet 11 need not be the same as the tolerance $h'$ for the sheet 12. That is, the height $h$ of the triangle 21, 22 may be different from the height $h'$ of the triangle 23, 24.

It is also advantageous to make the separation distance between one pair 23, 24 of triangles in the set 20 less than the separation distance of the other pair 21, 22, and to position the corners 23a, 24a of the closer pair of triangles 23, 24 between the corresponding corners 21a, 22a of the more widely separated pair of triangles 21, 22. The benefits which accrue from this arrangement will be understood with reference to FIGS. 3 through 7.

Generally a plurality of pages 10 are severed simultaneously so as to form a stack 11' of sheets 11 (FIG. 3) and a stack 12' of sheets 12 (FIG. 4). If the pages are cut exactly along the trim line defined by the reference edges 17, 17' there will be two pairs 26, 27 and 26', 27' of stripes visible along the side 28 of the stack 11'. These stripes are formed by the ink from the corners 21a, 22a of the respective triangular trim marks 21, 22. These stripes, having the appearance of FIG. 3, indicate that the stack 11' has been severed exactly along the desired reference edge 17. Similarly, two pair of stripes 29, 30 and 29', 30' will be visible along the side 31 of the stack 12' (FIG. 4) if this stack has been severed exactly along the reference edge 17'.

If the pages have been severed along a line 32 (FIG. 2) that is parallel to the desired trim line but offset therefrom toward the side of sheet 11, the stack 11' will have the appearance of FIG. 5. In this case, the stripes 26, 27 and 26', 27' will be of greater thickness than shown in FIG. 3. Indeed, the width w of each such stripe will be equal to the extent of offset of the actual cut from the desired reference edge 17. As shown in FIG. 2, this results from the use of the equilateral triangle shape for each trim mark 21, 22.

If the actual cut is offset from the reference edge 17 in the direction of the test 12, the side 28 of the stack 11' will have the appearance shown in FIG. 6. There, two pairs of stripes 26a, 27a, 26a', 27a' are apparent, the separation distance between the stripes in each pair being less than that in the case shown in FIG. 5. In this case, where the actual cut has been made along the line 33 of FIG. 2, the width $w'$ of each stripe again will correspond to the extent of offset of the actual cut from the desired reference edge 17'. This again results from the use of equilateral triangles as the trim marks 23, 24.

Since the height $h$ and $h'$ of the trim marks 21–24 correspond to the acceptable tolerance for offset of the actual severance line, the cases shown in FIGS. 5 and 6 result in acceptable test sheets 11 and 12. If the actual cut had been made outside of these acceptable tolerance limits, no stripes would be visible on the sides 28, 31 of the stacks 11' and 12'.

In the example of FIG. 7, the sheets 10 have been severed along a line skewed with respect to the reference edge 17. As a result, the side 28 of the stack 11' contains one pair of stripes 26b, 27b that are relatively widely spaced apart and another pair of stripes 26b', 27b' that are more narrowly spaced. Of course, the stripes 26b, 27b correspond to the trim marks 21, 22 of the first set 20 (FIG. 1) and the stripes 26b', 27b' correspond to the trim marks 23, 24 of the second set 20'.

Although two sets 20, 20' of trim marks have been illustrated herein, the invention is not so limited. Only one such set would suffice, or alternatively, three or more such sets may be employed. In the alternate embodiment of FIG. 8, the set 30 of trim marks consists of a first pair of equilateral triangles 31, 32 printed on the sheet 11 and a second pair of equilateral triangles 33, 34 printed on the sheet 12. As in the embodiment of FIG. 2, the corners 31a, 32a lie along the trim line 17 and the corners 33a, 34a are on the trim line 17', however, the adjacent sides 31b, 32b of the triangles 31, 32 are respectively aligned with the corresponding adjacent sides 33b, 34b of the triangles 33, 34. To distinguish the direction of offset, the triangles 31 and 32 may be of one color and the triangles 33, 34 of a different color. Thus, if the page 10 is severed above the trim line 17, the stripes visible along the side of a stack of sheets will be one color, but if the page is severed below the line 17', the stripes will be of the other color.

Intending to claim all novel, useful & unobvious features shown or described, the inventor makes the following claims:

1. Trim marks for a page to be severed along a trim line to form a sheet containing indicia to be read automatically by sensors aligned a fixed distance from a severed edge of said sheet, said trim marks comprising:
   a first set of equilateral triangles printed on said page on one side of the desired trim line, each triangle in said first set being oriented with one corner along said trim line and one side adjacent said corner extending perpendicular to said trim line, so that the side opposite said one corner is parallel to said trim line but spaced therefrom, the length of said one adjacent side being equal to the maximum acceptable trim tolerance for severance offset in the direction of that first set, and
   a second set of equilateral triangles printed on said page on the opposite side of the desired trim line, each triangle in said second set being oriented with one corner along said trim line and one side adjacent said corner extending perpendicular to said trim line so that the side opposite said one corner is parallel to said trim line but spaced therefrom, the length of said one adjacent side being equal to the maximum acceptable trim tolerance for severance offset in the direction of said second set, whereby when said page is severed exactly on said trim line, only the corner points of said triangles are visible at the severed edge of said sheet, and whereby when said page is severed off said trim line but within tolerance, the width of the truncated triangle visible at the severed edge of said sheet corresponds exactly to the amount of offset of the severed edge from said trim line.

2. Trim marks according to claim 1 wherein said trim line is defined by the locii of said triangle one corners.

3. Trim marks according to claim 1 wherein said first and second sets each contain at least one pair of triangles, and wherein the distance parallel to said trim line between the triangles of each pair in said first set is different from that between the triangles in each pair in said second set.

4. Trim marks according to claim 3 wherein the distance between the triangles in each pair of said second set is less than that between the triangles in each pair of said first set, and wherein the trim-line defining one corners of the pair of triangles in said second set are situated between the trim-line defining one corners of the pair of triangles in said first set.

5. Trim marks according to claim 4 wherein said page contains two sheets formed by severing said page along said trim line, said trim marks thereby being common to both sheets.

6. Trim marks according to claim 4 wherein each set contains two pair of triangles, the pairs of triangles in said first set being relatively widely separated as compared to the separation distance between the triangles forming each pair in said first set.

* * * * *